(12) United States Patent
Yano

(10) Patent No.: US 6,326,705 B1
(45) Date of Patent: Dec. 4, 2001

(54) VEHICULAR ANTI-THEFT SYSTEM (75) Inventor: Masato Yano, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/348,263

(22) Filed: Jul. 7, 1999

(30) Foreign Application Priority Data

Jul. 15, 1998 (JP) .................................................. 10-200282

(51) Int. Cl.$^7$ .................................................. B60R 25/00
(52) U.S. Cl. ...................... 307/10.2; 307/10.1; 307/10.3; 307/10.6; 340/426
(58) Field of Search .................................. 307/10.2, 10.3, 307/10.5, 10.6; 340/426; 290/33, 34, 35; 701/32, 33; 180/287

(56) References Cited

U.S. PATENT DOCUMENTS 5,637,929   6/1997   Treharne .
5,684,339  11/1997   Treharne .
5,861,816   1/1999   Funakoshi et al. .
6,025,653 * 2/2000   Hayashi et al. ........................ 290/33

FOREIGN PATENT DOCUMENTS 9-136614   5/1997   (JP) .

* cited by examiner

Primary Examiner—Fritz Fleming
Assistant Examiner—Robert L. DeBeradinis
(74) Attorney, Agent, or Firm—Nixon & Vanderhye P.C.

(57) ABSTRACT

A vehicle anti-theft system, which can prevent a vehicle from being unjustly moved and can prevent a password code for anti-theft from being stolen. This system includes: detecting whether a main relay has been turned on for a predetermined time after an ignition switch if turned off; increasing a number in a counter to detect that the main relay has not been operating for the predetermined time and cutting off engine fuel injection and ignition control to prohibit the engine from operating when the counter contents is equal to or more than a predetermined number. Therefore, the operation of the engine and potential password code theft by communication can be prohibited.

11 Claims, 6 Drawing Sheets

VEHICULAR ANTI-THEFT SYSTEM

CROSS REFERENCE TO RELATED APPLICATION

This application is based upon Japanese Patent Application No. Hei. 10-200282 filed on Jul. 15, 1998, the contents of which are incorporated herein by reference.

BACKGROUND OF THE INVENTION

1. Field of the Invention

This invention generally relates to a vehicular anti-theft system, and especially to a vehicular anti-theft system to prevent a vehicle from being stolen by using a password code unique to each vehicle.

2. Related Art

Recently, a vehicular anti-theft system, in which a password code comparison is executed between a password code of an electronic ignition key (hereinafter, called "ignition key") and a password code registered in a vehicle, and then an operation of an engine is detected whether it should be continued or not based on a comparison result when the password code comparison completes, is proposed. In this vehicular anti-theft system a start-up of the engine proceeds until the code comparison completes to prevent decreased startability of the engine.

In the above-mentioned vehicular anti-theft system, the start-up of the engine proceeds during the password code comparison by an ECU (Electronic Control Unit), when an ignition switch is turned on at the time of starting the vehicle. Therefore, the vehicle may be moved until the code comparison completes. That is, even when an unjust operation in which, for example, the ignition switch is turned on and the password code comparison of the ECU is repeated, the vehicle may be repeatedly moved for a short distance.

Furthermore, at the time the engine starts up, when a power supply to the ECU is repeatedly connected and disconnected, an anti-theft communication may be repeatedly performed, and then the password code for anti-theft may be repeatedly sent onto a communication line. Therefore, the password code may be easily collected from the communication line, that is, the password code may be easily stolen.

SUMMARY OF THE INVENTION

This invention was conceived in view of the background thus far described and its first object is to provide a vehicular anti-theft system, which can prevent a vehicle from being unjustly moved.

A second object is to provide a vehicular anti-theft system, which can prevent a password code for anti-theft from being stolen.

According to the present invention, detecting means detects whether the main relay has been operating for a predetermined time after an ignition switch is turned off. Counting means increases a number in which the detecting means detects that the main relay has not been operating for the predetermined time. Operation prohibiting means prohibits a vehicle from being operated when the the content of the counting means is equal to or more than a predetermined number. Therefore, the operation of the engine can be prohibited when an unjust power-off is detected and a number of unjust power-off cycles reaches the predetermined number. Hence, it can prevent the vehicle from being stolen without fail.

BRIEF DESCRIPTION OF THE DRAWINGS

These and another objects, features and characteristics of the present invention will be appreciated from a study of the following detailed description, the appended claims, and drawings, all of which form a part of this application. In the drawings:

DESCRIPTION OF THE PREFERRED EMBODIMENTS

A preferred embodiment of the present invention will be explained with reference to accompanying drawings.

Figure 1:
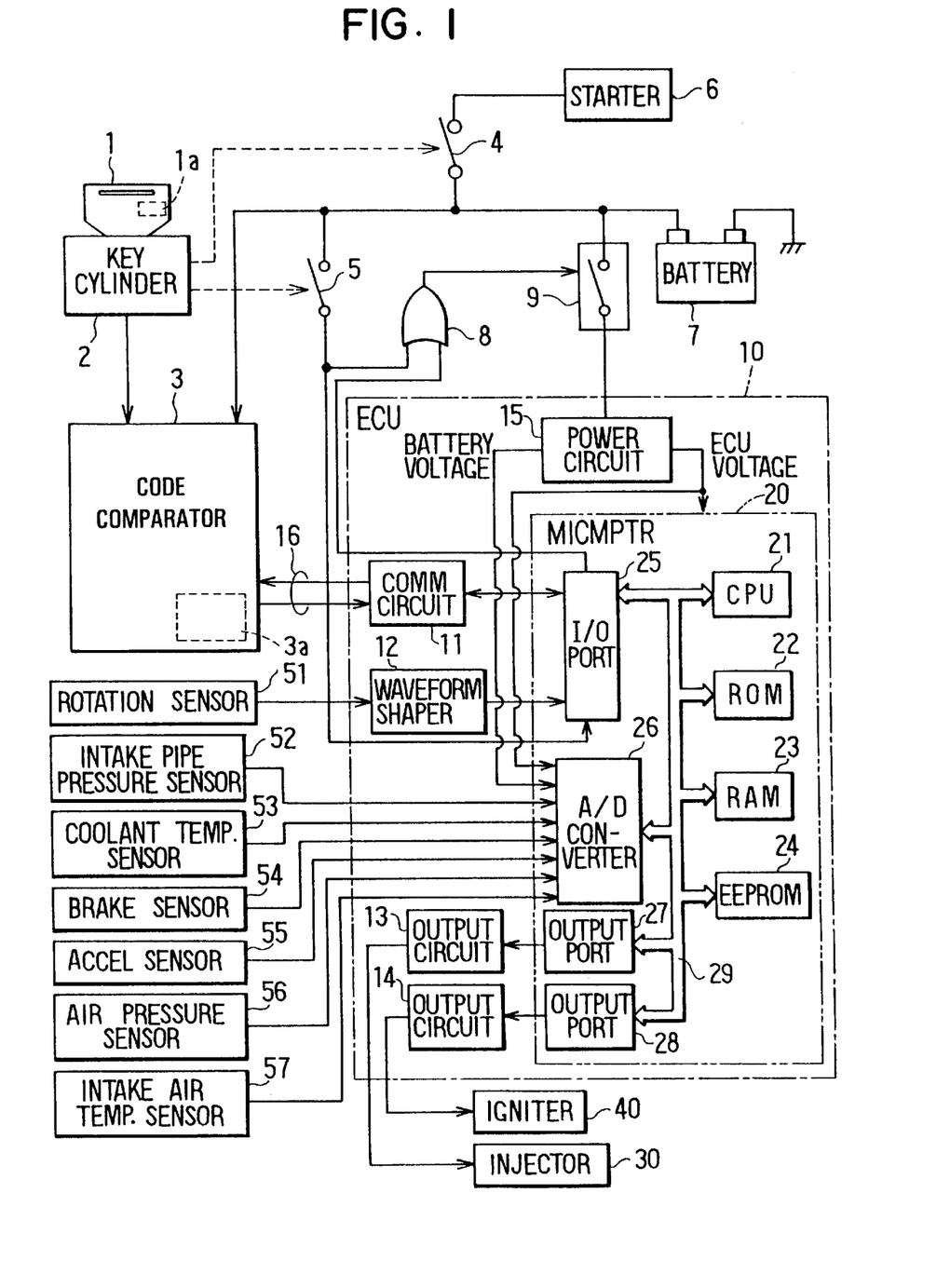
FIG. 1 is a schematic diagram illustrating a construction of a vehicular anti-theft system of the present invention.

FIG. 1 is a schematic diagram illustrating whole construction of a vehicular anti-theft system of this embodiment.

In FIG. 1, an electronic ignition key (hereinafter, called "ignition key") 1 has a memory 1a to store a predetermined password code for anti-theft. An ignition key cylinder 2 has a (not-shown) reader to read the password code in the ignition key 1. A code comparator 3 has a memory 3a to store a password code, and a (not-shown) microcomputer to compare the password code in the memory 1a of the ignition key 1 and the password code in the memory 3a so as to detect whether the ignition key inserted to the ignition key cylinder 2 is a regular (valid) ignition key 1.

A starter switch 4 and an ignition switch 5, which are switched from an opened (turned off) condition to a closed (turned on) condition by inserting the ignition key to the ignition key cylinder 2 and by its rotary operation, are provided. When the starter switch 4 is turned on (closed condition), a power from a battery 7 is supplied to a starter 6 via the starter switch 4 to start up the starter 6. When the ignition switch 5 is turned on (changed from opened condition to closed condition), an output from an OR circuit 8 is changed from Lo (Low) to Hi (High), and then a main relay 9 is turned on (changed from opened condition to closed condition). Consequently, the power from the battery 7 is supplied to an ECU (Electronic Control Unit) 10. Here, since the ECU 10 can set the output of the OR circuit 8 to Hi to maintain the main relay turn on for a predetermined time by inputting an output of the ECU 10 to the OR circuit 8, the power supply from the battery 7 to the ECU 10 can be maintained for the predetermined time via the main relay 9. Furthermore, since the ignition switch 5 is turned on, the power from the battery 7 is supplied to an fuel injector 30 and an igniter 40.

The ECU 10 includes a communication circuit 11, a waveform shaper 12, output circuits 13, 14, a power circuit 15 and a microcomputer (MICMPTR) 20.

This microcomputer 20 is an ALU (Arithmetic Logic Unit) including a CPU (Central Processing Unit) 21, a ROM (Read Only Memory) 22 to store control programs, a stand-by RAM 23 to store a various kind of data, an EEPROM (Electrically Erasable Programmable ROM) 24, an input/output port 25, an A/D converter 26, output ports 27, 28, a bus line to connect each of the above portions, and so on. Here, an ECU power voltage (5 [V]) is generated from a battery voltage (12[V]) supplied to the power circuit 15 of the ECU 10, and the ECU power voltage is supplied to the microcomputer 20. Furthermore, the battery voltage supplied to the power circuit 15 and the ECU power voltage generated by the power circuit 15 are input to the microcomputer 20 via the A/D converter 26 to be monitored.

The CPU 21 of the microcomputer 20 calculates a fuel injection amount or an ignition timing by using the control programs stored in the ROM 22 based on a various kinds of data calculated from a various kinds of sensor signals such as a rotation speed data calculated from a engine rotation speed detected by a rotation sensor 51, an intake pressure data calculated from a intake pressure signal output from an intake pipe pressure sensor 52, output of a coolant temperature sensor 53, output of a brake sensor 54, output of an acceleration sensor 55, output of an air pressure sensor 56, and an intake air temperature sensor 57. The fuel injector 30 and the igniter 40 are controlled based on the calculated operation condition to perform an adequately control for an operation of the engine.

Here, a password code to be used for communication between the code comparator 3 and the ECU 10 is stored in the EEPROM 24. The code comparator 3 and the communication circuit 11 of the ECU 10 are connected via a communication line 16. The password code stored in the memory 3a in the code comparator 3 is sent to the communication circuit 11 via the communication line 16.

When the ignition key 1 is inserted to the ignition key cylinder 2, the password code stored in the memory 1a in the ignition key 1 is read, and then the password code is sent to the code comparator 3 via the ignition key cylinder 2. After that, the code comparator 3 compares the password code in the ignition key 1 and the password code in the code comparator 3. Furthermore, when the ignition witch 5 is turned on as a result of the operation of the ignition key 1 by a driver, the power is supplied to the ECU 10 to turn on it, and then a request signal is sent from the ECU 10 to the code comparator 3.

When the ECU 10 detects that the ignition switch 5 is turned on, the request signal to the code comparator 3 is generated. The request signal includes a random number therein, and is encoded to prevent from decoding even if the request signal is read by an unjust method. The encoded request signal is sent from the ECU 10 to the code comparator 3. When the code comparator 3 receives the request signal, the code comparator recognizes the request signal, and then compares the password code contained in the request signal and the password code stored in the memory 1a in the ignition key 1.

When both password codes compare favorably with each other, the code comparator 3 generates a new signal by combining the random number from the ECU 10 and the password code stored in the memory 3a, encodes the generated new signal, and then sends the encoded new signal to the ECU 10. When both password codes do not accord with each other, the code comparator 3 prohibits the new signal from generating and sending.

When the ECU 10 receives the signal from the code comparator within a predetermined time, the ECU 10 decodes the received signal. When the random number contained in the received signal accords with the previously sent random number and the password code contained in the received signal accords with the password code stored in the EEPROM 24, the ECU 10 permits to operate the engine. On the contrary, the ECU 10 stops the fuel injection and the ignition control to stop the engine in the other condition.

Figure 8A:
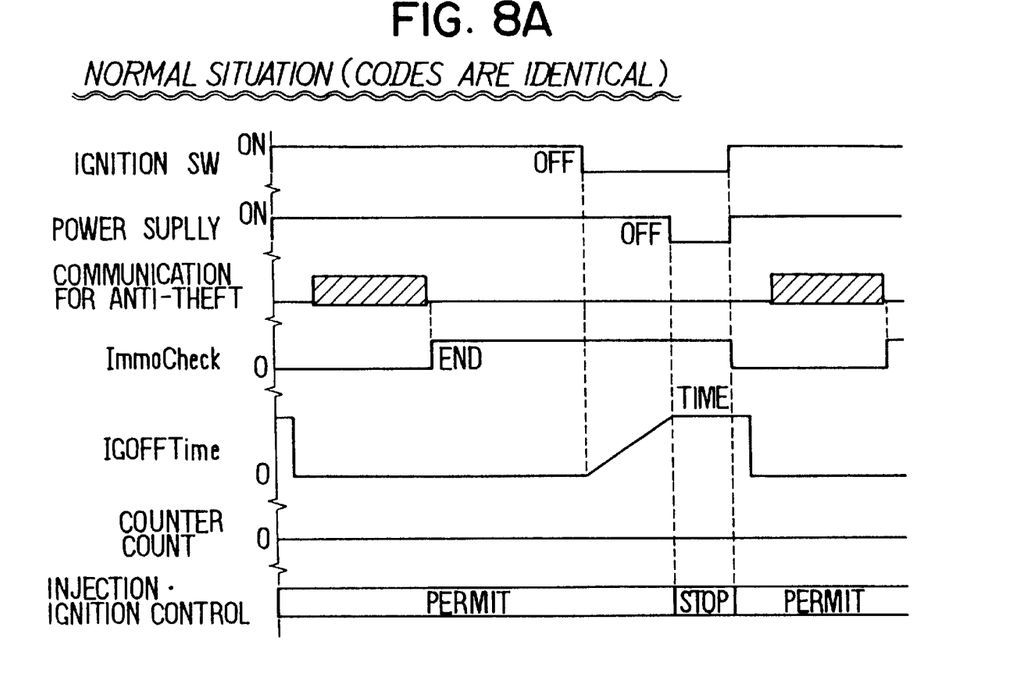
FIGS. 8A, 8B are time charts illustrating changes of each signals for the unjust power-off detection.
Figure 8B:
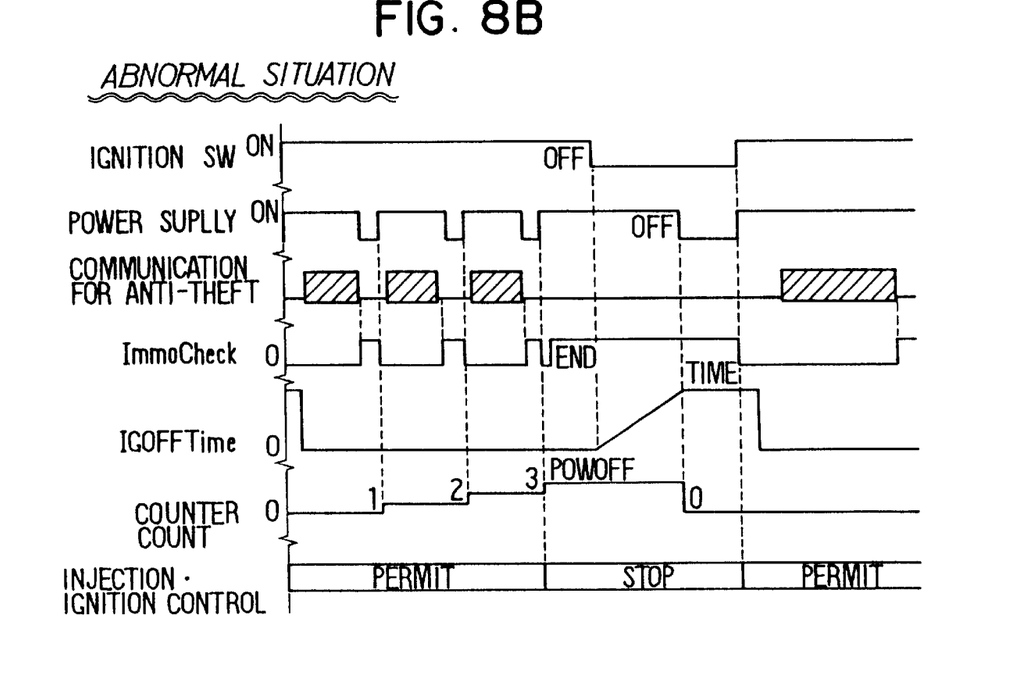

Next, a process of an unjust power-off detection executed by the ECU will be explained with reference to a flow chart shown in FIG. 2 and a time chart shown in FIGS. 8A, 8B. Here, FIGS. 8A, 8B are time charts illustrating changes of each signals for the unjust power-off detection. FIG. 8A shows a normal situation (password codes are identical), and FIG. 8B shows an abnormal situation. This process shown in FIG. 2 is executed at an initial step at every a power-on-reset of the ECU 10.

Figure 2:
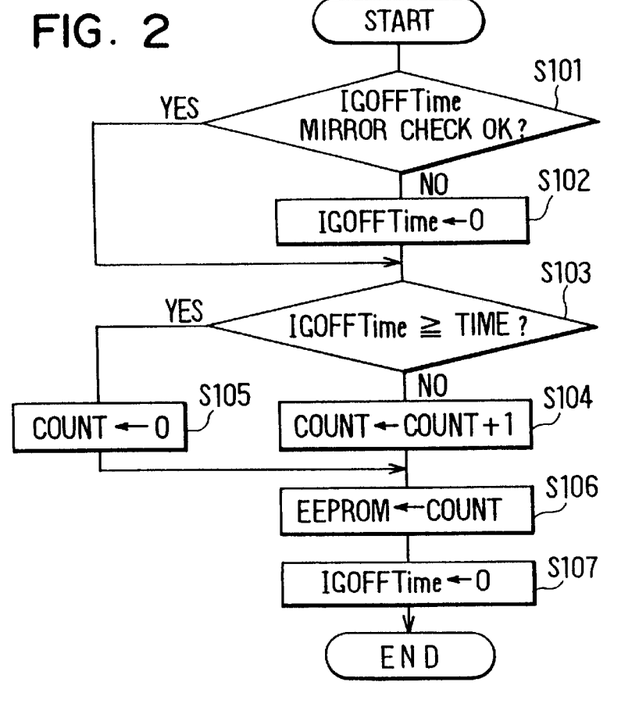
FIG. 2 is a flow chart of a process of an unjust power-off detection executed by an ECU in the vehicular anti-theft system.

In FIG. 2, at step S101, an IGOFFTime, which is an operation time that the main relay has been operating after the ignition switch 5 is turned off, is mirror-checked, and is detected whether mirror-check is OK or NG. When a detection condition is not affirmed at step S101, that is, the mirror-check of the IGOFFTime is NG, the ECU 10 moves onto the step S102. At step S102, the IGOFFTime is cleared to "0". On the contrary, when the detection condition is affirmed at step S101, that is, the mirror-check of the IGOFFTime is OK, the ECU 10 skips step S102 to move on to step S103.

At step S103, the ECU 10 detects that the IGOFFTime is equal to or more than a predetermined time TIME. When a detection condition at step S103 is not affirmed, that is, the IGOFFTime is less than the predetermined time TIME, the ECU 10 moves on to step S104. At step S104, a counter value COUNT is increased by "+1", as shown in FIG. 8B. On the contrary, when the detection condition at step S103 is affirmed, that is, the IGOFFTime is equal to or more than the predetermined time TIME, the ECU 10 moves on to step S105. At step S105, the counter value COUNT is cleared to "0", as shown in FIG. 8A. At step S106, the counter value COUNT is written into the EEPROM 24. At step S107, the IGOFFTime is cleared to "0". After that, this routine is discontinued.

Next, a process of a password code comparison executed by the ECU 10 and code comparator 3 will be explained with reference to flow charts shown in FIGS. 3, 4 and time charts shown in FIGS. 8A, 8B. These processes shown in FIGS. 3, 4 are executed at every time the ignition switch 5 is turned on.

Figure 3:
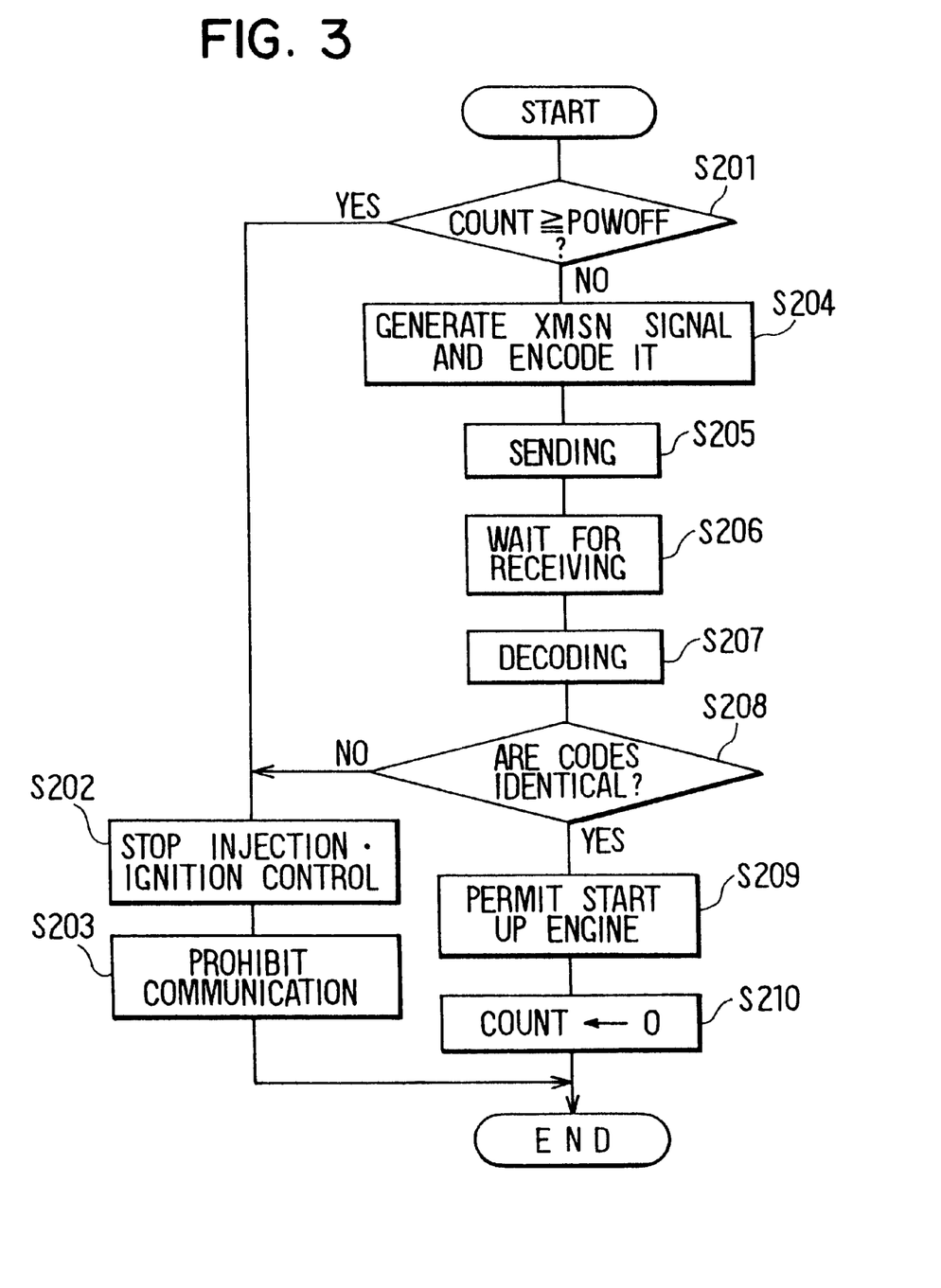
FIG. 3 is a flow chart of a process of a password code comparison executed by the ECU in the vehicular anti-theft system.

In the process of the ECU 10 side, as shown in FIG. 3, at step S201, the ECU 10 detects whether the counter value COUNT is equal to or more than a predetermined number POWOFF, which is a power off number for prohibiting the engine from being operated. When a detection condition at step S201 is affirmed, that is, the counter value COUNT is equal to or more than a predetermined number POWOFF, the ECU 10 moves on to step S202. At step S202, the ECU stops the fuel injection and the ignition control, as shown in FIG. 8B, because an unjust power off is repeatedly done. After that, the ECU 10 moves on to step S203, the ECU 10 prohibits itself from communicating with the code comparator 3. Then the ECU 10 discontinues this routine.

On the contrary, when the detection condition at step S201 is not affirmed, that is, the counter value COUNT is less than the predetermined number POWOFF, the ECU 10 moves on to step S204. At step S204, the ECU 10 generates a transmission (XMSN) signal, and encodes it. At step S205, the ECU 10 sends the encoded transmission signal to the code comparator 3. At step S206, the ECU 10 is set to a receive-wait-condition that is waiting for receiving a signal from the code comparator 3.

Figure 4:
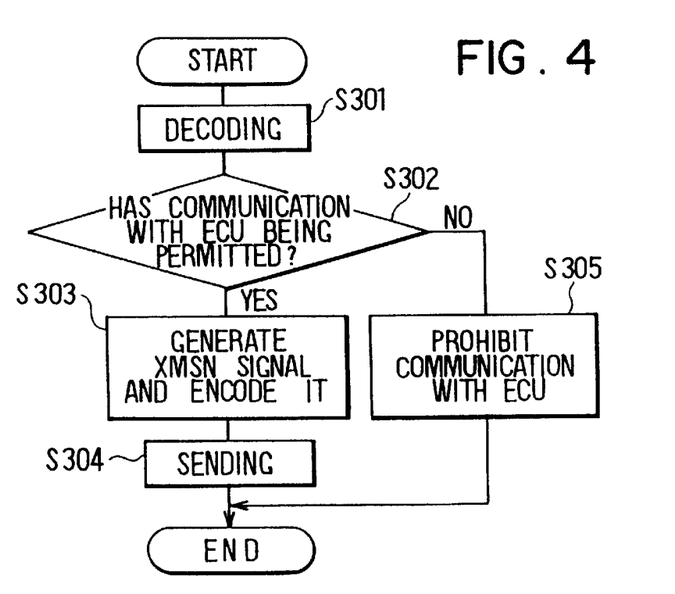
FIG. 4 is a flow chart of a process of a password code comparison executed by a password code comparator in the vehicular anti-theft system.

When the code comparator 3 receives the encoded transmission signal generated at step S205, the code comparator 3 executes a process shown in FIG. 4, as an interruption process. At step S301, the code comparator 3 decodes the transmission signal from the ECU 10. At step S302, the code comparator 3 detects whether a communication with the ECU 10 should be permitted or not. When a detection condition at step S302 is affirmed, that is, the communication with the ECU 10 is permitted, the code comparator 3 moves on to step S303 at step S303, the code comparator 3 generates the transmission signal, and encodes it. At step S304, the transmission signal encoded at step S303 is sent to the ECU 10. After that, this routine is discontinued. On the contrary, when the detection condition at step S302 is not affirmed, that is, the communication with the ECU 10 is prohibited, the code comparator moves on to step S305. At step S305, the code comparator 3 executes a prohibiting communication process. After that, the code comparator 3 discontinues this routine.

Next, when the ECU 10 receives the transmission signal from the code comparator 3 at step S206 in FIG. 3, the ECU 10 moves on to Step S207. At step S207, the ECU 10 decodes the received transmission signal from the code comparator 3. At step S208, the ECU 10 detects whether the password codes accord with each other. When a detection condition at step S208 is not affirmed, that is, the password codes do not accord with each other, the ECU 10 moves on to step S202 to execute similar process. On the contrary, when the detection condition at step S208 is affirmed, that is, the password codes are identical, the ECU 10 moves on to step S209. At step S209, a start-up of the engine is permitted. At step S210, the counter value COUNT is cleared to "0". After that, this routine is discontinued.

Next, a process of a fuel injection and an ignition control executed by the ECU 10 will be explained with reference to flow charts shown in FIG. 5 and the time charts shown in FIGS. 8A, 8B. This process shown in FIG. 5 is executed at every 8 ms.

Figure 5:
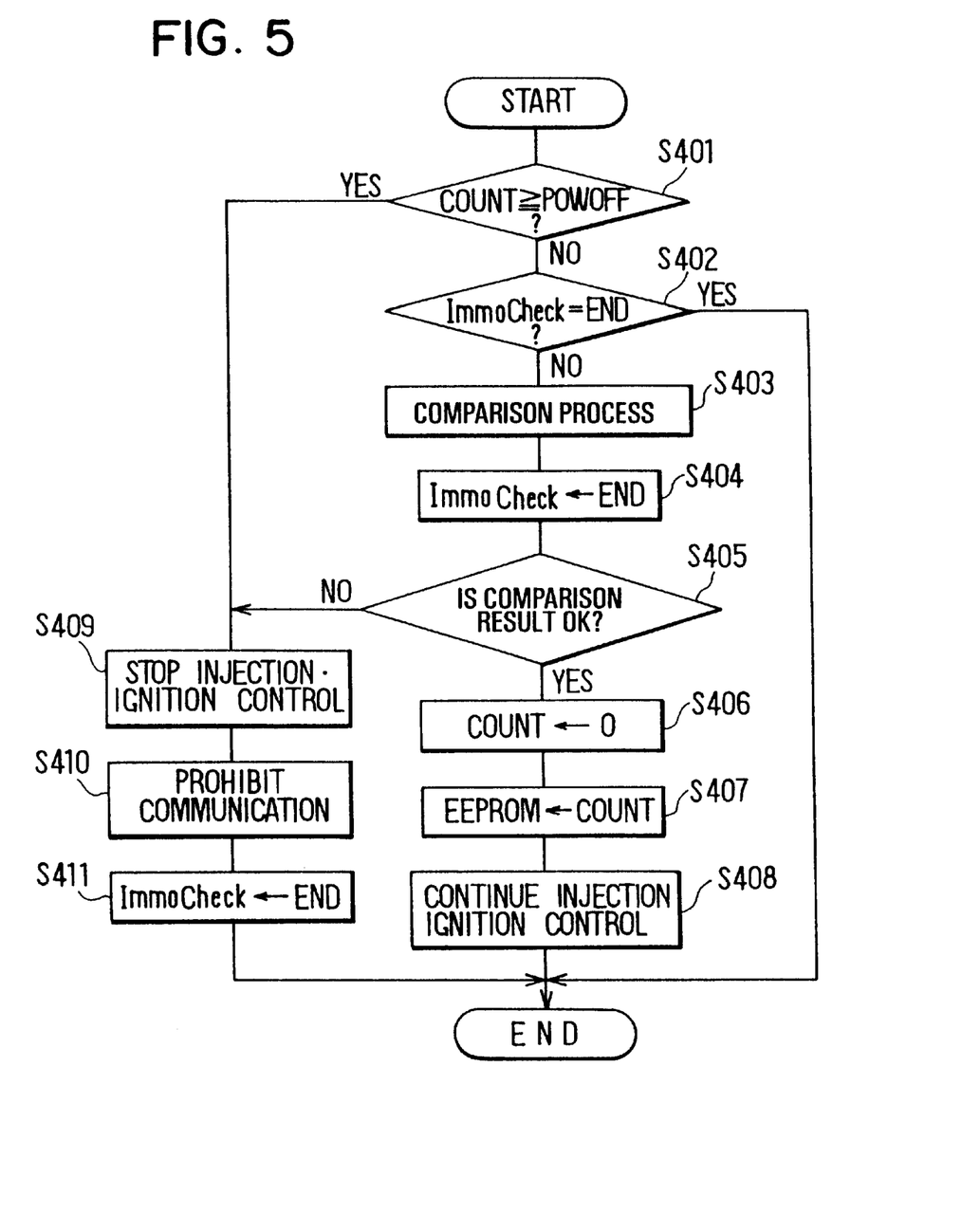
FIG. 5 is a flow chart of a process of a fuel injection and an ignition control executed by the ECU in the vehicular anti-theft system.

In FIG. 5, at step S401, the ECU 10 detects whether the counter value COUNT for cutting off the power is equal to or more than the POWOFF (as referred to FIG. 8B). When a detection condition at step S401 is not affirmed, that is, when the counter value COUNT is smaller than the POWOFF, the ECU 10 moves on to step S402. At step S402, the ECU 10 detects whether ImmoCheck is equal to END, that is, collation processes shown in FIGS. 3, 4 for collating a password code for anti-theft has completed or not. When a detection condition at step S402 is not affirmed, that is, the ECU 10 detects that the collation processes have not completed, the ECU 10 moves on to the step S403. At step S403, the processes of the password code comparison shown in FIGS. 3, 4 are executed. At step S404, ImmoCheck←END, that is, the processes of the password code comparison is discontinued (As referred to FIG. 8A).

At step S405, the ECU 10 detects that whether a comparison result is OK or not. When a detection condition at step S405 is affirmed, that is, when the comparison result is OK and the password codes accord with each other, the ECU 10 moves on to step S406. At step S406, the counter value COUNT is cleared to "0". At step S407, the ECU 10 writes the counter value COUNT into the EEPROM 24, that is, the counter value in the EEPROM 24 is cleared to "0". At step S408, the ECU 10 permits (continues) the fuel injection and the ignition control (as referred to FIG. 8A), and then discontinues this routine. On the other hand, when the detection condition at step S402 is affirmed, that is, the ECU 10 detects that the comparison process has completed, the ECU 10 skips steps S403–S408 to discontinue this routine.

When the detection condition at step S401 is affirmed, that is, the counter value COUNT is equal to or more than the POWOFF (as referred to FIG. 8B), or when the detection condition at step S405 is not affirmed, that is, the comparison result is NG and the password codes do not accord with each other, the ECU 10 moves on to the S409. At step S409, the ECU 10 cuts off the fuel injection and the ignition control. At step S410, the ECU 10 prohibits itself from performing the communication of the password code for anti-theft. At step S411, ImmoCheck←END, that is, the processes of the password code comparison is discontinued, and then this routine is discontinued.

Next, a process of an IGOFFTime calculation executed by the ECU 10 will be explained with reference to a flow chart shown in FIG. 6 and the time charts shown in FIGS. 8A, 8B. This process shown in FIG. 6 is executed at every 1 ms independently of the ON/OFF of the ignition switch 5.

Figure 6:
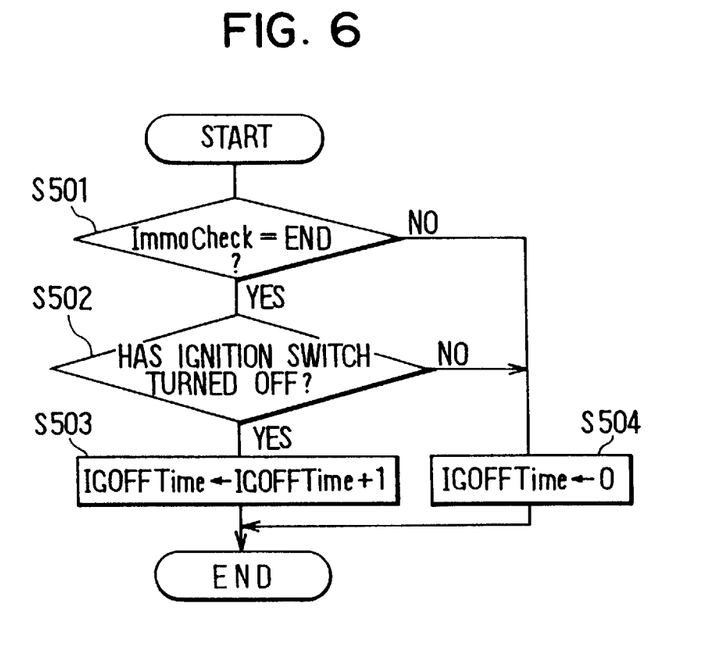
FIG. 6 is a flowchart of a process of an IGOFFTime calculation executed by the ECU in the vehicular anti-theft system.

In FIG. 6, at step S501, the ECU 10 detects whether ImmoCheck is equal to END, that is, the process for comparing the password code for anti-theft has completed or not. This detection process is executed to prevent from a false detection when the power is cut off during the comparison process. When a detection condition is affirmed, that is, when the ECU 10 detects that the comparison process has completed, the ECU 10 moves on to step S502. At step S502, the ECU 10 detects whether the ignition switch is OFF. When a detection condition at step S502 is affirmed, that is, the ignition switch is OFF, the ECU 10 moves on to step S503. At step S503, the IGOFFTime, which is the operation time of the main relay 9 in which the main relay is being turned on after the ignition switch is turned off, is increased by 1 second (as referred to FIGS. 8A, 8B). After that, this routine is discontinued.

On the contrary, when the detection condition at step S501 is not affirmed, that is, the ECU 10 detects that the comparison processes have not completed, or when the detection condition at step S502 is not affirmed, that is, when the ignition switch 5 is ON, the ECU 10 moves on to step S504. At step S504, the IGOFFTime is cleared to "0". After that, this routine is discontinued.

Next, a process of a main relay control after the process of an IGOFFTime calculation shown in FIG. 6 will be explained with reference to a flow chart shown in FIG. 7, and the time charts shown in FIGS. 8A, 8B. Here, this process is repeatedly executed at every 64 ms.

Figure 7:
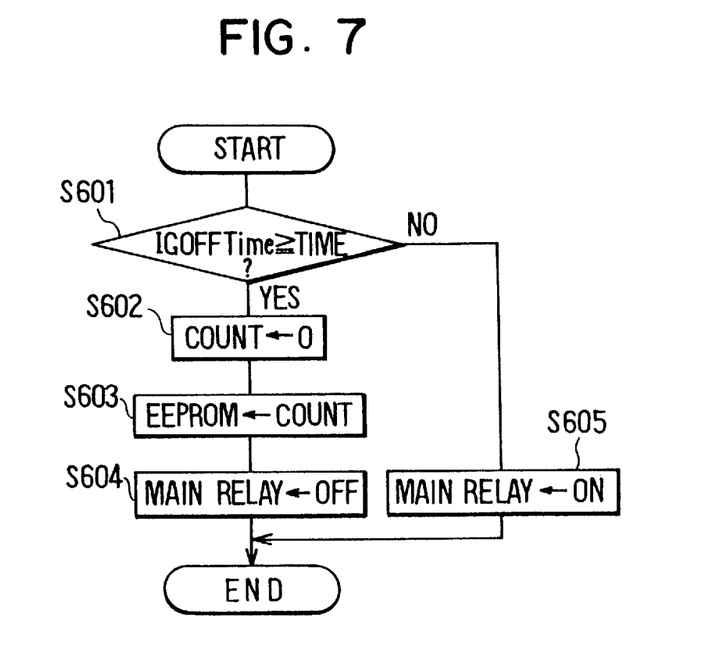
FIG. 7 is a flow chart of a process of a main relay control executed by the ECU in the vehicular anti-theft system.

In FIG. 7, at step S601, the ECU 10 detects whether the IGOFFTime, which is the operation time of the main relay 9 in which the main relay has been turning on after the ignition switch is turned off, is equal to or more a predetermined time TIME. When a detection condition at step S601 is affirmed, that is, the IGOFFTime is long enough to be equal to or more than the predetermined time TIME, the ECU 10 moves on to step S602. At step 602, the counter value COUNT is cleared to "0". That is, when the ON condition of the main relay 9 continues so that the IGOFF-Time is equal to or more than the predetermined time TIME, the ECU 10 recognizes that the start-up of the engine is not due to the unjust conduct, and then clears the counter value COUNT to "0"(as referred to FIG. 8A). At step S603, the ECU 10 writes the counter value COUNT to the EEPROM 24, that is, the counter value in the EEPROM 24 is cleared to "0".

Here, when the ON control of the main relay is needed even after the IGOFFTime is equal to or more than the predetermined time TIME, if the ignition switch is turned on again in this situation, it needs to execute the process of the password code comparison. However, by previously clearing the counter value COUNT at steps S602, S603, the process of the password code comparison can be executed without being prohibited. At step S604, the main relay 9 is turned off (power off). After that, this routine is discontinued.

On the other hand, when the detection condition is not affirmed, that is, the IGOFFTime is short so that it is less than the predetermined time TIME, the ECU 10 moves on to step S605. At step S605, the main relay 9 is turned on (maintain the power supply). After that, this routine is discontinued.

As described the above, according to the vehicular anti-theft system of this embodiment, the power supply to the ECU 10 is maintained for a predetermined time via the main relay 9 even after the ignition key 5 is turned off. This system includes: a detecting means achieved by the ECU 10, and detects whether the main relay 9 has been turning on for the predetermined time after the ignition switch 5 is turned off; a counting means achieved by the ECU 10, and increases a number, in which the detecting means detects that the main relay 9 has not operated for the predetermined time, by using the counter value COUNT; and an operation prohibiting means achieved by the ECU 10, and cuts off the fuel injection and the ignition control against the engine to prohibit the engine from being operated when the number of the counter value COUNT is equal to or more than the predetermined number POWOFF as a result of the operation of the counting means.

Furthermore, the detecting means includes a time measuring means for measuring the IGOFFTime which is the time the ignition switch 5 is OFF and the main relay 9 is ON.

Therefore, the number, in which the main relay 9 has not been operating for the predetermined time in which is the time the ignition switch 5 is OFF and the main relay 9 is ON, is increased by using the counter value COUNT. When the number of the counter value COUNT become equal to or more than the predetermined number POWOFF, the ECU 10 cuts off the fuel injection and the ignition control against the engine to prohibit the engine from being operated. Therefore, the operation of the engine can be prohibited when the unjust power off is detected and the number of the unjust power off reaches the predetermined number. Hence, it can prevent the vehicle from being stolen without fail.

Furthermore, the counting means includes the EEPROM 24 as a rewritable nonvolatile memory to store the number of the counter value COUNT. Therefore, the number of the counter value COUNT is kept to be stored in the EEPROM 24 even if the battery 7 is removed so as to cut the power. Hence, it can detect the unjust power of by comparing the number of the counter value COUNT with the predetermined number POWOFF to prohibit itself from performing the fuel injection, the ignition control and the communication for anti-theft.

Furthermore, in this embodiment, the operation prohibiting means achieved by the ECU 10 prohibits itself from performing the fuel injection, the ignition control and the communication for anti-theft. That is, in order to prevent the vehicle from being stolen, one method for cutting off the fuel injection and the ignition control to prohibit the engine from being operated and another method for prohibiting the communication for anti-theft to prohibit the engine from being operated.

Here, the one method performs large effects for anti-theft because of the following reason. That is, although the vehicle may be moved for a short distance because the start-up of the engine proceeds during the password code comparison, it is impossible for the vehicle to be moved for a long distance because the start-up of the engine is prohibited when the number of the unjust power off becomes equal to or more than the predetermined number.

The other method performs large effects for anti-theft because the communication for the anti-theft is prohibited when the password code unique to the vehicle is likely to be stolen as the number of unjust power off becomes equal to or more than the predetermined number.

In this embodiment, the EEPROM 24 is used for storing the number of the counter value COUNT, however, a flash ROM or the like may be used.

What is claimed is:

1. A vehicular anti-theft system in which power is supplied to an electronic control unit via a main relay for a predetermined time after an ignition switch is turned off, the electronic control unit comprising:

detecting means for detecting whether the main relay has been operating for the predetermined time after the ignition switch is turned off;

counting means for counting the number of times the detecting means detects that the main relay has not been operating for the predetermined time; and operation prohibiting means for prohibiting an operation of a vehicle when the number counted by the counting means is equal to or more than a predetermined number.

2. A vehicular anti-theft system as in claim 1, wherein:

the counting means increases its content when the detecting means detects that the main relay has not been operating for the predetermined time; and the operation prohibiting means prohibits the operation of the vehicle when the increased content of the counting means is equal to or more than the predetermined number.

3. A vehicular anti-theft system as in claim 1, wherein:

the detecting means includes a time measuring means for measuring time when the ignition switch is OFF and the main relay is ON.

4. A vehicular anti-theft system as in claim 1, wherein:

the counting means includes a nonvolatile memory to store its contents.

5. A vehicular anti-theft system as in claim 1, wherein:

the operation prohibiting means prohibits operation of at least one of: (a) fuel injection (b) ignition control and (c) communication of a security code for anti-theft from.

6. A vehicular anti-theft system for preventing a vehicle from being stolen, said system comprising:

a regular operation detecting means that: (a) detects whether engine start-up is due to a regular operation or not, (b) performs a predetermined process with data received via a communication line when regular engine start-up is detected, and (c) sends processed data to the communication line as response data;

an engine control means connected to the regular operation detecting means via the communication line to communicate with each other, for: (a) controlling the engine, (b) for sending data to the regular operation detecting portion, and (c) for stopping an operation of the engine when the detecting means detects that engine start-up is not due to a regular operation; and a monitor means for monitoring operations of the regular operation detecting means and the engine control means, comprising:
- detecting means for detecting whether the engine control means has been operating for a predetermined time after the engine control means starts operation;
- counting means for counting when the detecting means detects that the engine control means has not been operating for the predetermined time; and
- communication prohibiting means for prohibiting communication of security code data between the regular operation detecting means and the engine control means via the communication line.

7. A vehicular anti-theft method for preventing a vehicle from being stolen, said method comprising:

detecting whether a main relay has been operating for a predetermined time after an ignition switch is turned off;

counting when the detecting means detects that the main relay has not turned off for the predetermined time; and prohibiting a vehicle from being operating when the counted amount is equal to or more than a predetermined amount.

8. A vehicular anti-theft method as in claim 7 wherein:

the detecting step includes measuring time when the ignition switch is OFF and the main relay is ON.

9. A vehicular anti-theft method as in claim 7 wherein:

the counting step includes use of a nonvolatile memory.

10. A vehicular anti-theft method as in claim 7 wherein:

the prohibiting step prohibits operation of at least one of: (a) fuel injection, (b) ignition control and (c) communication of a security code for anti-theft.

11. A vehicular anti-theft method for preventing a vehicle from being stolen, said method comprising:

detecting whether engine start-up is due to a regular operation or not, performing a predetermined process with data received via a communication line when regular engine start-up is detected and sending processed data to the communication line as response data;

communicating with an engine controller via the communication line for: (a) controlling the engine, (b) for sending data for use in said detecting step and (c) for stopping an operation of the engine when the detecting step detects that engine start-up is not due to a regular operation; and monitoring the above stated operations by:
- detecting whether the engine controller has been operating for a predetermined time after engine start;
- counting when the detecting step detects that the engine controller has not been operating for the predetermined time; and
- prohibiting communication of security code data via the communication line.

* * * * *